(12) United States Patent
Suzuki

(10) Patent No.: US 9,311,010 B2
(45) Date of Patent: Apr. 12, 2016

(54) DISK ARRAY UNIT, AND METHOD AND PROGRAM FOR CONTROLLING POWER SOURCE IN DISK ARRAY UNIT

(75) Inventor: Ryo Suzuki, Tokyo (JP)

(73) Assignee: NEC CORPORATION, Tokyo (JP)

(*) Notice: Subject to any disclaimer, the term of this patent is extended or adjusted under 35 U.S.C. 154(b) by 1350 days.

(21) Appl. No.: 12/643,012

(22) Filed: Dec. 21, 2009

(65) Prior Publication Data

US 2010/0169688 A1    Jul. 1, 2010

(30) Foreign Application Priority Data

Dec. 26, 2008 (JP) ................................ 2008-333640

(51) Int. Cl.
*G06F 3/06* (2006.01)

(52) U.S. Cl.
CPC .............. *G06F 3/0634* (2013.01); *G06F 3/067* (2013.01); *G06F 3/0617* (2013.01); *G06F 3/0625* (2013.01); *G11B 2220/41* (2013.01); *Y02B 60/1246* (2013.01)

(58) Field of Classification Search
USPC .................................... 713/300, 324; 711/113
See application file for complete search history.

(56) References Cited

U.S. PATENT DOCUMENTS

| | | | | |
|---|---|---|---|---|
| 5,898,880 A * | 4/1999 | Ryu | ............................. | 713/323 |
| 5,905,994 A * | 5/1999 | Hori et al. | ..................... | 711/113 |
| 2002/0087899 A1 * | 7/2002 | Kano et al. | ..................... | 713/300 |
| 2005/0210304 A1 * | 9/2005 | Hartung et al. | ............... | 713/320 |
| 2005/0240814 A1 * | 10/2005 | Sasakura et al. | ................ | 714/14 |
| 2005/0270681 A1 * | 12/2005 | Suzuki et al. | ................... | 360/69 |
| 2006/0259796 A1 * | 11/2006 | Fung | ............................. | 713/300 |
| 2006/0265617 A1 * | 11/2006 | Priborsky | ....................... | 713/320 |
| 2008/0005595 A1 * | 1/2008 | Spengler et al. | .............. | 713/300 |
| 2009/0006876 A1 * | 1/2009 | Fukatani et al. | ............... | 713/320 |
| 2009/0077478 A1 * | 3/2009 | Gillingham et al. | .......... | 715/763 |
| 2009/0228674 A1 * | 9/2009 | Ouchi | ........................... | 711/168 |
| 2009/0300374 A1 * | 12/2009 | Mori | ............................. | 713/300 |

FOREIGN PATENT DOCUMENTS

| | | |
|---|---|---|
| JP | 2001337789 A | 12/2001 |
| JP | 2001339853 A | 12/2001 |
| JP | 2002108573 A | 4/2002 |
| JP | 2003036125 A | 2/2003 |
| JP | 2004302721 A | 10/2004 |
| JP | 2007141264 A | 6/2007 |
| JP | 2009266017 A | 11/2009 |

OTHER PUBLICATIONS

Japanese Office Action for JP2008-333640 issued May 11, 2011.

* cited by examiner

*Primary Examiner* — Brandon Kinsey

(57) ABSTRACT

Intended is improvement in reliability of a disk array unit formed of a plurality of nodes at the time of start-up and stop. The disk array unit formed of a plurality of nodes, which includes a control unit which executes power source control of other node based on power source control information set at one of the nodes by inter-node communication executed through a common signal line which connects each node.

21 Claims, 6 Drawing Sheets

FIG. 2
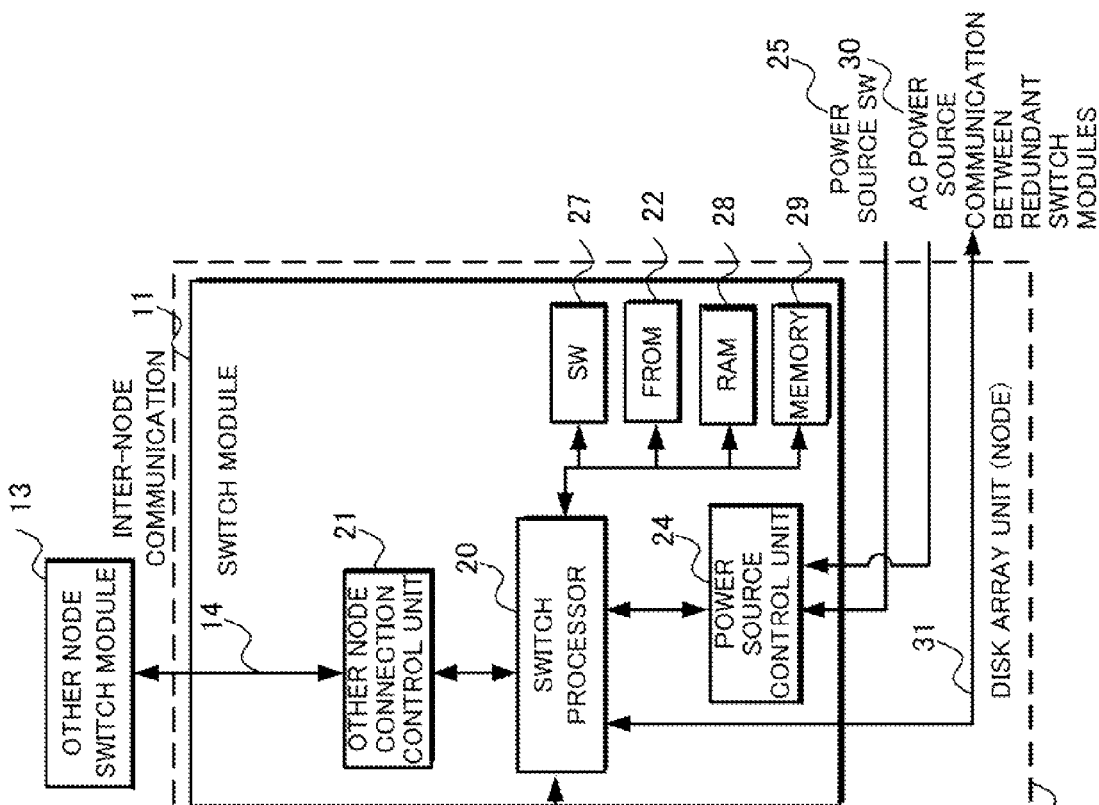
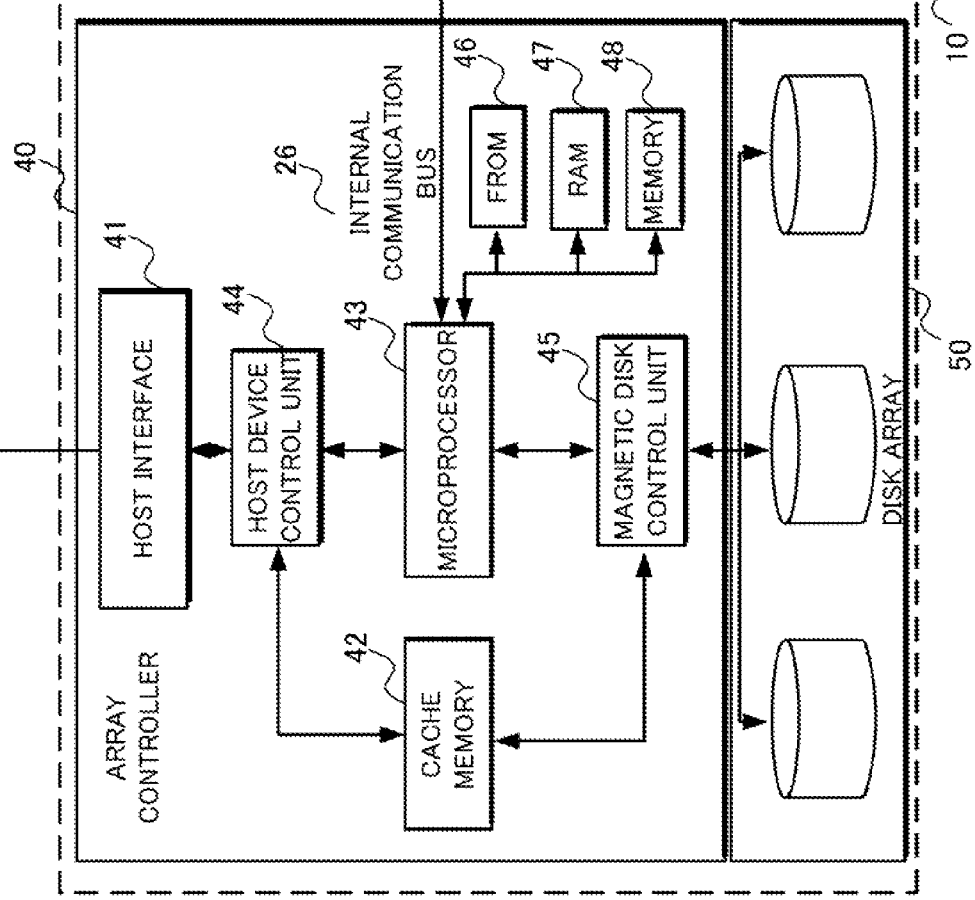

DISK ARRAY UNIT, AND METHOD AND PROGRAM FOR CONTROLLING POWER SOURCE IN DISK ARRAY UNIT

INCORPORATION BY REFERENCE

This application is based upon and claims the benefit of priority from Japanese patent application No. 2008-333640, filed on Dec. 26, 2008, the disclosure of which is incorporated herein in its entirety by reference.

TECHNICAL FIELD

The present invention relates to a disk array unit formed of a plurality of nodes, and a power source control method and a power source control program in the device.

BACKGROUND ART

Disk array unit is in general formed of a disk array in which a plurality of magnetic disks are stored and an array controller for reading/writing a magnetic disk stored in the disk array. Because this device structure, when used as a storage system to which a host refers through a network, however, has a shortcoming of poor expandability, frequently used in recent years is a disk array unit in which an array controller and a disk array are managed in the lump as a node basis to have excellent expandability by connecting these nodes.

In the above-described disk array unit formed of a plurality of nodes, some start-up order among nodes often hinders normal initialization processing and accordingly prevents start-up. Similarly, at the time of power-off, normal stop might be hindered by some order of power-off. More specifically, in a disk array unit formed of a plurality of nodes, different timing caused by the order of power-on or power-off in some cases prevents normal start-up or stop of the disk array unit, which is a problem in terms of reliability or data integrity.

Under these circumstances, as disclosed in Patent Laying-Open No. 2002-108573 (Patent Literature 1), known is a disk array unit which executes power-on, power-off and re-activation of a disk developing a fault in order to prevent an originally normal disk from executing degenerate operation when a disk error occurs. Also known, as disclosed in Patent Laying-Open No. 2007-141264 (Patent Literature 2), is a storage system with a switch device provided between a host device and a storage device to realize improvement in storage expandability and reliability according to management information for managing a structure of the storage device.

Patent Literature 1: Japanese Patent Laying-Open No. 2002-108573.

Patent Literature 2: Japanese Patent Laying-Open No. 2007-141264.

The technique disclosed in Patent Literature 1, however, relates to power source control of a disk drive as a single body and not to power source control of entire structure, including an array controller, of a disk array unit formed of a plurality of nodes.

According to the technique disclosed in Patent Literature 2, a switch device in charge of a hub of the Ethernet (registered trade mark) is provided between a host interface and a host adapter having a disk array, which fails to solve the problem of a disk array unit formed of a plurality of nodes whose normal start-up or stop might be prevented due to a difference in timing caused by the order of power-on or power-off as described above.

OBJECT OF THE PRESENT INVENTION

An object of the present invention is to provide a disk array unit formed of a plurality of nodes whose reliability at the time of start-up and stoppage is improved, and a power source control method and a power source control program in the disk array unit.

SUMMARY

According to a first exemplary aspect of the invention, a disk array unit formed of a plurality of nodes, includes a control unit which executes power source control of other node based on power source control information set at one of said nodes by inter-node communication executed through a common signal line which connects each said node.

According to a second exemplary aspect of the invention, a power source control method in a disk array unit formed of a plurality of nodes, includes a first step of sensing establishment of communication between respective said nodes by inter-node communication executed through a common signal line which connects each said node, and a second step of executing power source control of said extended node based on power source control information set at one of said nodes.

According to a third exemplary aspect of the invention, a computer readable medium storing a power source control program to be executed on a disk array unit formed of a plurality of nodes, wherein said power source control program causes a computer forming said disk array unit to execute a first processing of sensing establishment of communication between respective said nodes by inter-node communication executed through a common signal line which connects each said node, and a second processing of executing power source control of said extended node based on power source control information set at one of said nodes.

The present invention provides a disk array unit formed of a plurality anodes whose reliability at the time of start-up and stoppage is improved.

The reason is that by inter-node communication executed through a common signal line which connects each node, a control unit controls a power source of other node based on power source control information set in one node, thereby starting or stopping a node while synchronizing the nodes.

BRIEF DESCRIPTION OF THE DRAWINGS

FIG. 2 is a block diagram showing details of an internal structure of the disk array unit according to the first exemplary embodiment of the present invention;

EXEMPLARY EMBODIMENT (First Exemplary Embodiment)

Next, a first exemplary embodiment of the present invention will be detailed with reference to the drawings.

(Structure of the First Exemplary Embodiment)

Figure 1:
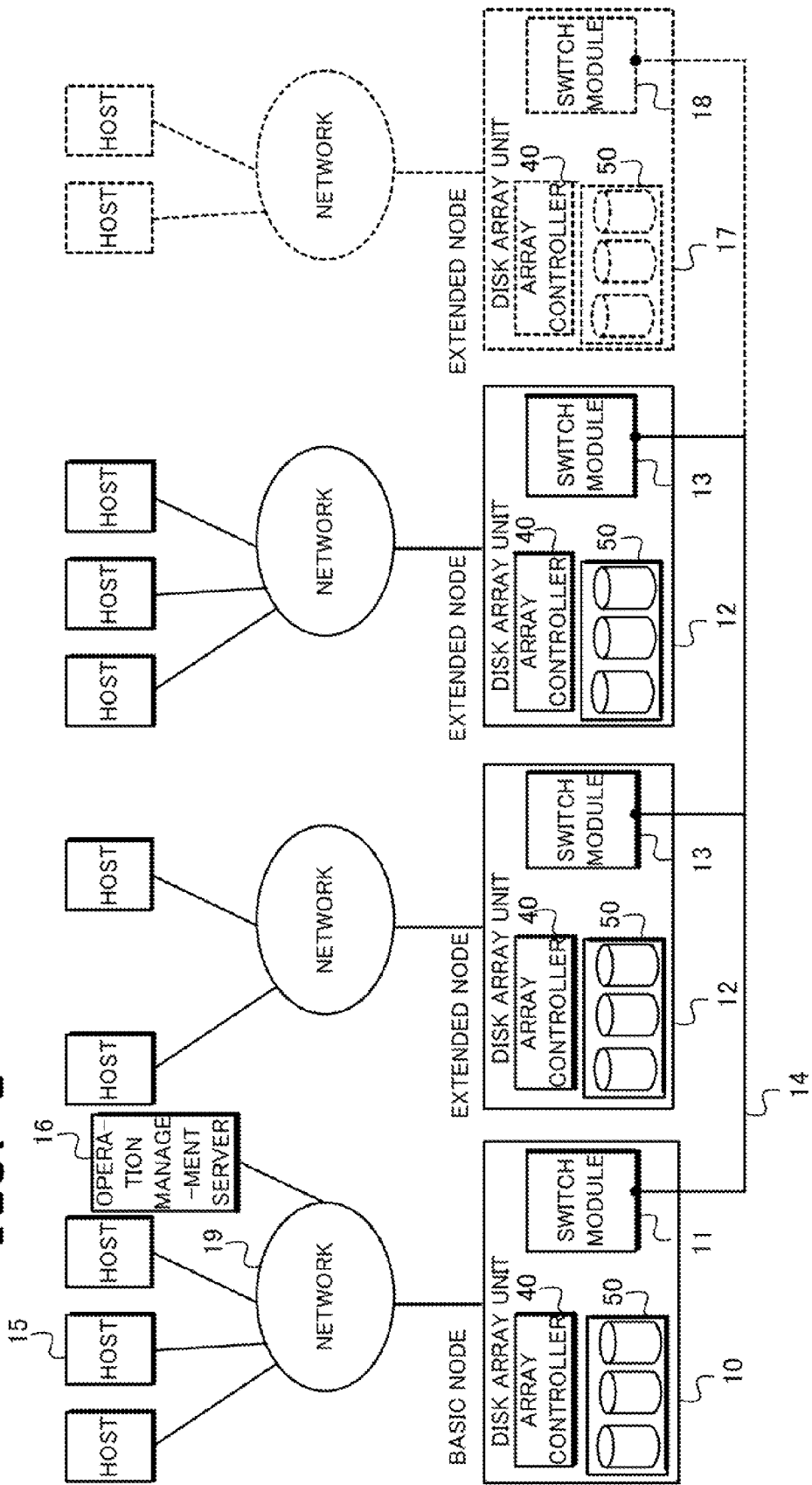
FIG. 1 is a block diagram showing a structure of a disk array unit formed of a plurality of nodes according to a first exemplary embodiment of the present invention.

With reference to FIG. 1 and FIG. 2, a structure of a disk array unit according to the present exemplary embodiment will be described.

FIG. 1 is a block diagram showing a structure of a disk array unit formed of a plurality of nodes according to the present exemplary embodiment and FIG. 2 is a block diagram showing a detailed internal structure of the disk array unit according to the present exemplary embodiment.

As shown in FIG. 1, the disk array unit according to the present exemplary embodiment adopts a system structure of an SAN (Storage Area Network) in which a plurality of hosts 15, a disk array unit 10 assigned as a basic node and a disk array unit 12 assigned as an extended node are connected by a network 19 through, for example, a fiber channel, for the purpose of integrating or sharing data among the plurality of hosts 15.

Here, as an abstract word, a transmission path including a fiber channel will be referred to as a link and the disk array units 10 and 12 connected to the link will be referred to as a node.

A disk array unit 10 as a basic node has a switch module 11 added to a main body of the disk array unit formed of an array controller 40 and a disk array 50.

The array controller 40, which is in charge of an interface with the plurality of hosts 15 connected through the network 19, executes read/write control of a magnetic disk stored in the disk array 50 according to a command issued from the host 15.

The switch module 11 executes power source control such as power-on or power-off by inter-node communication which is executed with a switch module 13 mounted on the disk array unit 12 as an extended node connected through a cable 14 for connecting switch modules (common signal line).

To the network 19, an operation management server 16 is connected. The operation management server 16 here executes, as an external device which will be described later, power source control information (power-on•power-off) setting input in place of power-on operation input by a power source switch.

Similarly to the above-described disk array unit 10 as a basic node, the disk array unit 12 as an extended node is also formed of a main body of the disk array including the array controller 40 and the disk array 50, and the switch module 13.

The switch module 13 mounted on the disk array unit 12 as an extended node is connected to the switch module 11 of the disk array unit 10 as a basic node through the cable 14 for connecting switch modules.

To the disk array unit according to the present exemplary embodiment, a disk array unit 17 as an extended node is in some cases connected as required.

Similarly to the above-described disk array unit 10 as a basic node, the disk array unit 17 as an extended node is also formed of a main body of the disk array including the array controller 40 and the disk array 50, and a switch module 18. The switch module 18 mounted on the disk array unit 17 as an extended node is connected to the switch module 11 of the disk array unit 10 as a basic node and the switch module 13 of the disk array unit 12 as an extended node through the cable 14 for connecting the switch modules.

Details of an internal structure of the disk array unit 10 as a basic node are shown in FIG. 2. The disk array unit 10 is formed of the main body of the disk array unit including the array controller 40 and the disk array 50, and the switch module 11 as described above.

As shown in FIG. 2, the switch module 11 is formed of a switch processor 20, an other node connection control unit 21, a flash ROM (FROM 22), a power source control unit 24, a structure setting switch (SW 27), a RAM 28 and a memory 29.

The switch processor 20 is the center of control of the switch module. The switch processor 20 uses the RAM 28 to control the other node connection control unit 21 according to a program recorded in the memory 29 and executes inter-node communication with the other node switch module 13 through the cable 14 for connecting switch modules.

The switch processor 20 also accepts input of operation of device power-on to the disk array unit main body or power-off of the same by a power source switch 25 connected through the power source control unit 24 and further, upon start of turning-on of electricity by the activation of an AC power source 30, controls the power source control unit 24 to execute power source control for the activation of a device power source to the main body of the disk array unit or power-off of the same.

The switch processor 20 functions as a control unit for controlling a power source of other node (the disk array unit 12 as an extended node) by the above-described inter-node communication executed through the cable 14 for connecting switch modules based on power source control information set at one node (the disk array unit 10 as a basic node).

The switch processor 20 also executes inter-processor communication with a microprocessor 43 mounted on the array controller 40 which will be described later by an internal communication bus 26 to execute bidirectional information exchange.

The structure setting switch (SW27) is capable of assigning the disk array unit 10 as a basic node or an extended node under the control of the switch processor 20 by setting operation by a system manager. It is assumed that setting of the structure information is executed before start of supply of the AC power source 30 to the disk array unit 10 and the disk array unit 12 and structure information set here is stored in the FROM 22.

The above-described switch module 11 is mounted redundantly in order to obtain high reliability. At the time of redundant packaging, information is exchanged by executing communication between redundant switch modules through a cable 31 (common signal line) for connecting redundant switch modules which cable is connected with other redundant switch module. Information exchanged here is a connection condition of other node and power source control information (power-on•power-off).

The array controller 40 comprises a host interface 41, a cache memory 42, the microprocessor 43, a host device control unit 44, a magnetic disk control unit 45, a flash ROM (FROM 46), a RAM 47 and a memory 48.

The host interface 41 is in charge of an interface with the host 15 connected via the network 19. Stored in the cache memory 42 is data whose use frequency is high on the magnetic disk stored in the disk array 50.

The microprocessor 43 is the center of control of the array controller 40 to execute a read/write command arriving from the host 15 by using the RAM 47 according to a program recorded in the memory 48. When the microprocessor 43 receives, for example, a write command from the host 15, the host device control unit 44 determines whether the cache memory 42 has a free region or not and when it has no cache page yet to be used, reads out the data stored in the cache memory 42 and writes the data to the magnetic disk of the disk array 50 through the magnetic disk control unit 45 to generate a cache page yet to be used. Then, obtain the cache page yet to be used and write the data received from the host 15 into the cache memory 44.

When the above-described write is completed, the host device control unit 44 opens the cache page to transmit a response to the host 15 through the host interface 41. The magnetic disk control unit 45 writes data yet to be written to a disk which data is on the cache memory 44 into the magnetic disk of the disk array 50 asynchronously with the execution of the write command from the host 15.

When the cache memory 42 has a cache page yet to be used, the host device control unit 44 obtains a cache page yet to be used and writes the data received from the host 15 into the cache memory 44. When the write is completed, open the cache page and transmit an end response to the host 15 through the host interface 41.

Although in the foregoing description, only the internal structure of the disk array unit 10 set as a basic node is illustrated, the disk array unit 12 set as an extended node is assumed to have the same structure.

(Operation of the First Exemplary Embodiment)

Next, description will be made of operation of thus structured disk array unit according to the present exemplary embodiment with reference to the flow chart shown in FIG. 3. Shown here is power-on processing executed by the switch processor 20 of the disk array unit 10 as a basic node.

Figure 3:
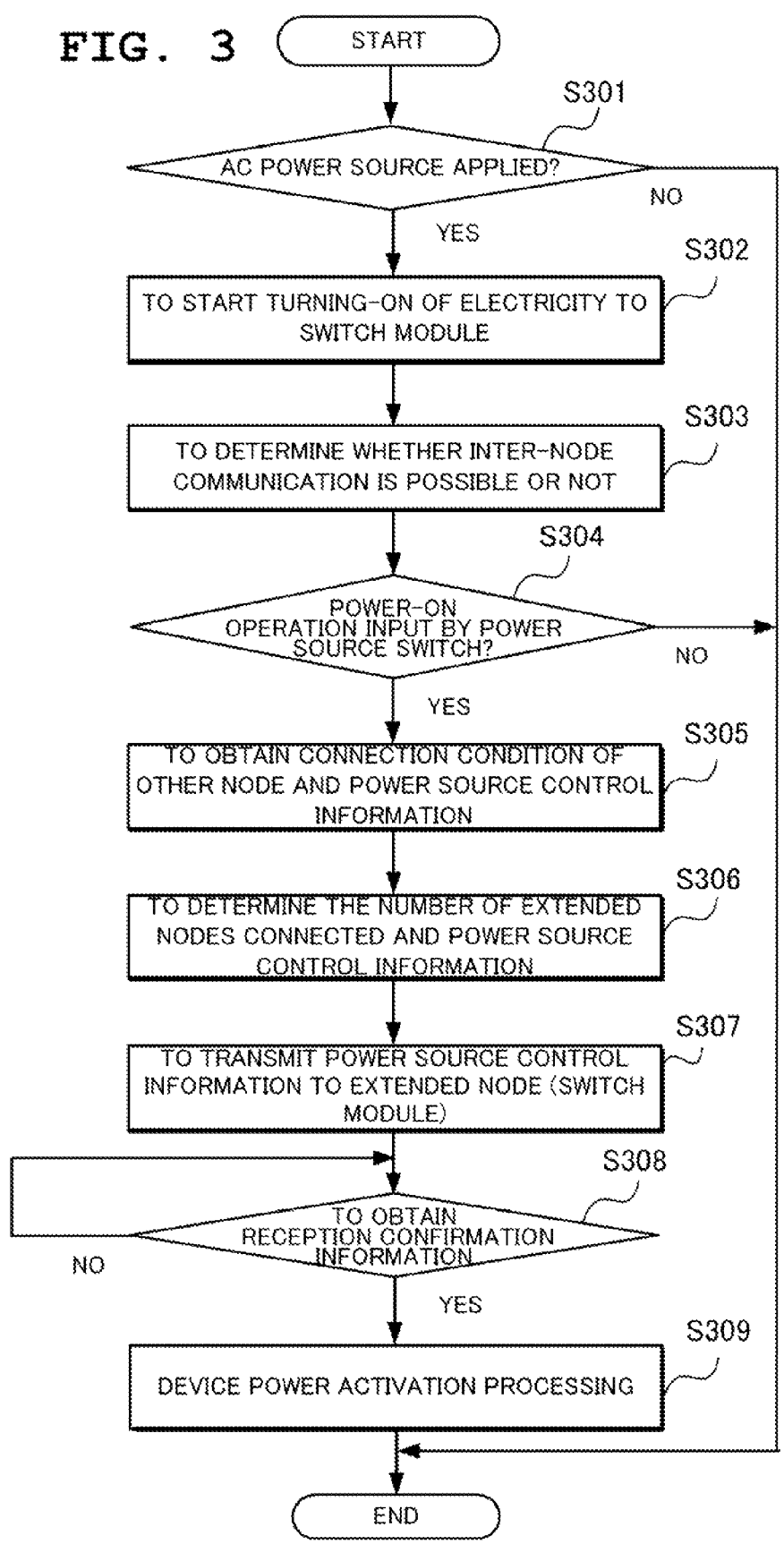
FIG. 3 is a flow chart showing operation of the disk array unit according to the first exemplary embodiment of the present invention.

As shown in the flow chart of FIG. 3, when the AC power source 30 is applied to the disk array unit according to the present exemplary embodiment, the power source control units 24 of the switch modules 11 and 13 sense the activation ("Yes" at Step S301) to start turning on electricity only of the switch modules 11 and 13 (Step S302). At this time, no electricity passes through the main body of the disk array unit formed of the array controller 40 and the disk array 50 mounted on the disk array units 10 and 20 as the respective nodes.

When the start of turning-on of the electricity to the switch modules 11 and 13 of the disk array units 10 and 12 as the respective nodes starts up the switch processor 20 mounted thereon, the switch processor 20 controls the other node connection control unit 21 to determine whether inter-node communication is possible with other node switch module 13 (Step S303).

At this time, the switch module 13 of the disk array unit 12 as an extended node enters a state of waiting for power source control information transmitted from the switch module 11 of the disk array unit 10 as a basic node irrespectively whether the above-described inter-node communication is possible, so that it is not allowed to execute power source control without reception of the power source control information (power-on) from the switch module 11 of the disk array unit 10 as a basic node.

It is as described above that the switch modules 11 and 13 provided on the disk array units 10 and 12 as the respective nodes are mounted redundantly in order to obtain high reliability. At the time of redundant packaging, the switch modules 11 and 13 execute communication between redundant switch modules through the cable 31 for connecting redundant switch modules to exchange information. The information exchanged here is a connection condition of other node and power source control information (power-on•power-off). Upon input of power-on operation by the power source switch 25, processing of device power-on to the main body of the disk array unit which will be described in the following is started.

Although the power source switch 25 is mounted on all the nodes, only the operation of the power source switch 25 mounted on the disk array unit 10 as a basic node is used as valid information for power source control and operation of the power source switch 25 mounted on the disk array unit 12 as an extended node is handled as invalid as power source control information.

When the information about power-on operation input (power-on) by the power source switch 25 is input to the power source control unit 24 of the switch module 11 in the disk array unit 10 as a basic node ("Yes" at Step S304), the switch processor 20 obtains a connection condition of other node and the power source control information (power-on•power-off) through the connection cable 31 for communication between redundant switch modules by the communication between redundant switch modules (Step S305). When the number of extended nodes connected varies with redundant switch modules, the switch processor 20 determines the less number of connections as the number of connections for the disk array unit. When the power source control information (power-on•power-off) varies, the switch processor 20 determines that power is applied (Step S306).

When the number of extended nodes connected and the power source control information (power-on) of the switch module 11 of the disk array unit 10 as a basic node are determined by the above determination, the switch processor 20 transmits, to the switch module 13 of the disk array unit 12 as an extended node, power source control information indicative of power-on by the inter-node communication through the other node connection control unit 21 and the cable 14 for connecting switch modules (Step S307).

Upon receiving the power source control information, the switch module 13 of the disk array unit 12 as an extended node transmits reception confirmation information to the switch module 11 of the disk array unit 10 as a basic node by inter-node communication. When failing to transmit the above-described reception confirmation information, the switch module 13 of the disk array unit 12 as an extended node refrains from starting activation of a device power source to the main body of its own disk array unit and upon being allowed to transmit the reception confirmation information, starts processing of applying a device power source to the main body of its own disk array unit.

On the other hand, first upon obtaining the reception confirmation information by the inter-node communication from the switch module 13 of the disk array unit 12 as an extended node ("Yes" at Step S308), the switch module 11 of the disk array unit 10 as a basic node is allowed to start the processing of applying a device power source to the main body of its own disk array unit (Step S309).

(Effects of the First Exemplary Embodiment)

As described in the foregoing, by applying power while synchronizing a plurality of nodes at the time of start-up of the disk array unit, the present exemplary embodiment enables initialization processing at the time of start-up to be executed normally.

The reason is that the switch module 11 mounted on the disk array unit 10 as a basic node discriminates a state of connection with an extended node by inter-node communication executed upon start of turning-on of electricity by the activation of the AC power source, after waiting for power-on operation input by the power source switch 25, transmits, to an extended node being connected, power source control information instructing to execute the processing of power-on to the main body of the disk array unit, obtains information of reception confirmation about the power source control information from the extended node which receives the power source control information and executes the processing of applying power to the main body of its own disk array unit, and executes the processing of power-on to the main body of its own disk array unit. This solves the problem that the disk array unit formed of a plurality of nodes fails to start normally due to different power-on timing.

(Second Exemplary Embodiment)

Next, a second exemplary embodiment of the present invention will be described.

The above-described disk array unit according to the first exemplary embodiment executes device power-on processing after waiting for power-on operation input by the power source switch 25 after the activation of the AC power source.

Depending on a form of operation, however, the power source switch 25 might not be operated constantly at the time of device power-on. Such a case can be coped similarly by setting the operation management server 16 or a maintenance terminal not shown to apply device power in linkage with AC power-on. In this case, as the setting information, the same setting information will be written to the FROM 22 among the redundant switch modules by using communication between redundant switch modules through the cable 31 for connecting redundant switch modules.

(Operation of the Second Exemplary Embodiment)

In the following, with a disk array unit to which a device power source is applied in linkage with AC power-on as a second exemplary embodiment, its processing procedure will be detailed by using the flow chart shown in FIG. 4.

Since a structure of the disk array unit according to the second exemplary embodiment which will be described in the following is the same as the above-described structure of the disk array unit according to the first exemplary embodiment, no description will be made thereof here for avoiding overlaps.

Similarly to the above-described first exemplary embodiment, the disk array unit according to the second exemplary embodiment is also assumed to have a structure of a basic node or an extended node set in advance for each of the disk array units 10 and 12 by the structure setting switch (SW 27) mounted on the switch modules 11 and 13 as respective nodes before AC power-on.

Figure 4:
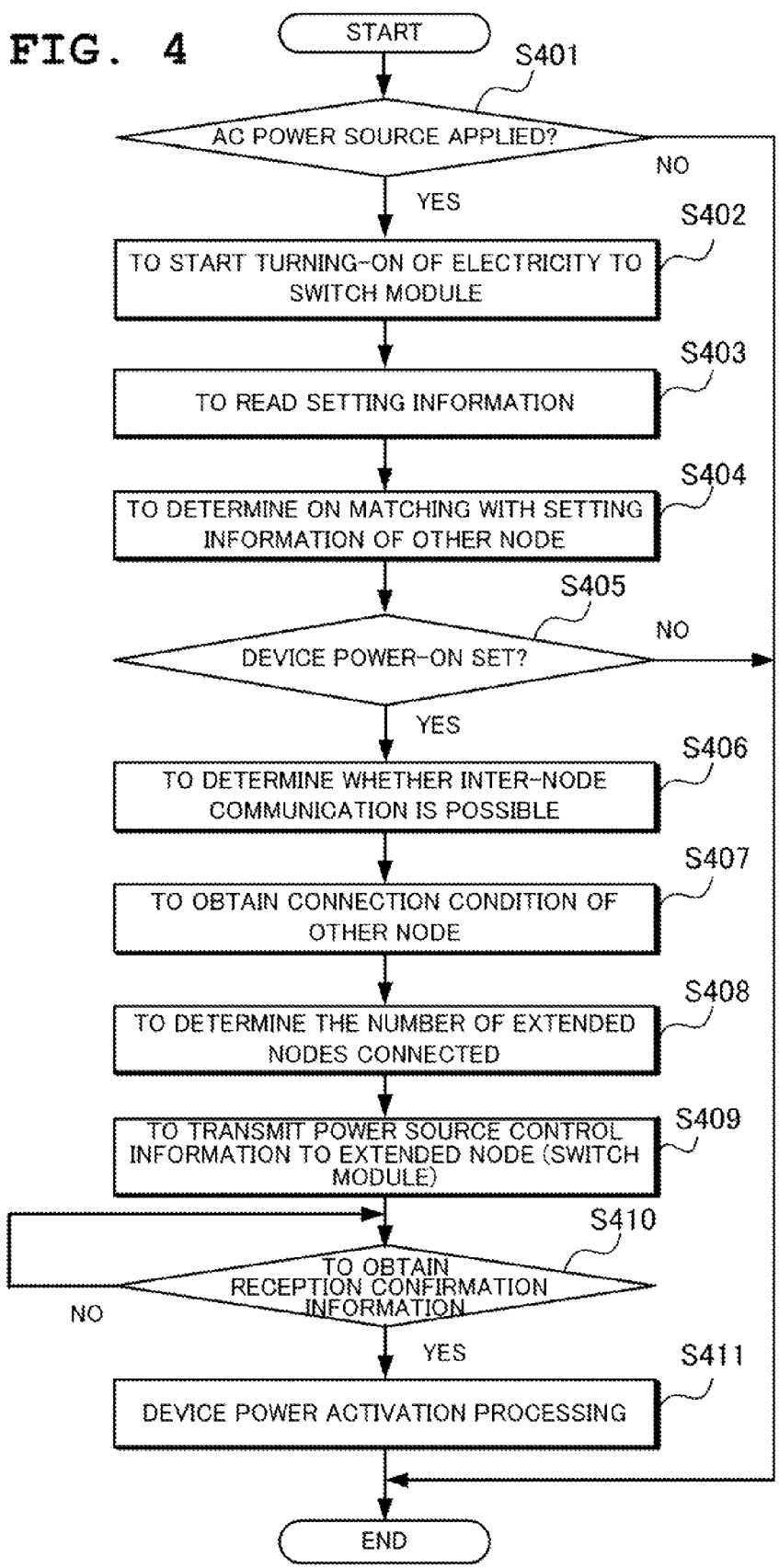
FIG. 4 is a flow chart showing operation of a disk array unit according to a second exemplary embodiment of the present invention.

As shown in the flow chart of FIG. 4, in the disk array unit according to the present exemplary embodiment, when the AC power source is applied ("Yes" at Step S401), turning-on of electricity is started only in the switch modules 11 and 13 as the respective nodes under the control of the power source control unit 24 (Step S402), whereby the switch processor 20 mounted on each of the switch modules 11 and 13 operates.

At this time, the switch processor 20 mounted on the switch module 11 of the disk array unit 10 as a basic node reads power source control information already set at the FROM 22 (step S403) to determine whether the information matches with the setting information in the FROM of other redundant switch module by the communication between redundant switch modules by using the cable 31 for connecting the redundant switch modules (Step S404). When the power source control information indicative of device power-on is set at the FROM 22 in any of the redundant switch modules at the time of AC power-on ("Yes" at Step S405), the switch processor 20 starts execution of power-on processing which will be described in the following.

More specifically, the switch processor 20 controls the other node connection control unit 21 to determine whether inter-node communication with the other node switch module 13 is possible or not (Step S406). At this time, the switch module 13 of the disk array unit 12 as an extended node enters a state of waiting for the power source control information from the switch module 11 of the disk array unit 10 as a basic node irrespectively whether the above-described inter-node communication is possible or not and executes no power source control without power source control information (power-on) from the switch module 11 of the disk array unit 10 as a basic node.

It is as described above that the switch modules 11 and 13 are mounted redundantly in order to obtain high reliability. At the time of redundant packaging, redundant switch modules in the switch modules 11 and 13 exchange information by executing communication between redundant switch modules through the cable 31 for connecting redundant switch modules (Step S407).

Information exchanged here is a connection condition of other node. When the number of extended nodes connected varies with redundant switch modules, the switch processor 20 determines the less number of connections as the number of connections for the disk array unit (Step S408).

When the number of extended nodes connected of the switch module 11 as a basic node is determined by the above determination, the switch processor 20 transmits, to the switch module 13 of the disk array unit 12 as an extended node, power source control information indicative of power-on which is previously read from the FROM 22 (Step S409).

Upon receiving the power source control information, (the switch processor 20 of) the switch module 13 of the disk array unit 12 as an extended node transmits reception confirmation information to the switch module 11 of the disk array unit 10 as a basic node by inter-node communication. When failing to transmit the above-described reception confirmation information, (the switch processor 20 of) the switch module 13 of the disk array unit 12 as an extended node refrains from starting activation of a device power source to the main body of its own disk array unit as an extended node and upon being allowed to transmit the reception confirmation information, starts the processing of applying a device power source to the main body of its own disk array unit.

On the other hand, first upon obtaining the reception confirmation information from the switch module 13 of the disk array unit 12 as an extended node ("Yes" at Step S410), the switch module 11 of the disk array unit 10 as a basic node is allowed to start the processing of applying a device power source to the main body of its own disk array unit (Step S411).

(Effects of the Second Exemplary Embodiment)

As described in the foregoing, at the time of start-up, the present exemplary embodiment enables device power-on while synchronizing a plurality of nodes in linkage with supply of an AC power source.

The reason is that the switch processor 20 mounted on the switch module 11 of the disk array unit 10 as a basic node discriminates a state of connection with an extended node by inter-node communication executed upon start of turning-on of electricity by the activation of the AC power source, transmits, to the extended node being connected, power source control information instructing to execute the processing of power-on to the main body of the disk array unit, obtains information of reception confirmation about the power source control information from the extended node which receives the power source control information and executes the processing of power-on to the main body of its own disk array unit, and executes the processing of applying power to the main body of its own disk array unit. This solves the problem that the disk array unit formed of a plurality of nodes fails to start normally due to different power-on timing.

Although the present exemplary embodiment has been described assuming that by setting the operation management server 18 as an external device or a maintenance terminal not shown to execute device power-on at the same time of AC power-on, the processing of applying the device power is executed in linkage with AC power-on without power-on operation input by the power source switch 25, flexible power source control according to the form of operation of the disk array unit formed of a plurality of nodes is enabled by switching control, by the switch processor 20, of this device power-on mode (second mode) and the device power-on mode (first mode) of executing activation of power to the disk array unit main body after waiting for input of power-on operation by the power source switch 25 mounted on the switch module 11 of the disk array unit 10 as a basic node.

(Third Exemplary Embodiment)

Next, a third exemplary embodiment of the present invention will be described.

Since a structure of a disk array unit according to the third exemplary embodiment which will be described in the following is the same as the structures of the disk array units according to the first and second exemplary embodiments, no description will be made thereof in order to avoid overlaps.

(Operation of the Third Exemplary Embodiment)

In the following, description will be made of processing to be executed when expanding a node to the disk array unit to which device power is already applied with reference to the flow chart shown in FIG. 5. Assuming here that a node to be expanded is limited to an extended node, shown is a procedure of processing executed by the switch module 18 mounted on the disk array unit 17 as a node expanded.

First, before the AC power source is applied to the disk array unit according to the present exemplary embodiment, by operating the structure setting switch (SW 27) mounted on the switch module 18 of the disk array unit 17 of the extended node, the system manager inputs setting of the structure information to set the disk array unit 17 to be expanded as an extended node. Then, the AC power source is applied by connecting the switch module 18 of the disk array unit 17 to the cable 14 for connecting switch modules.

Figure 5:
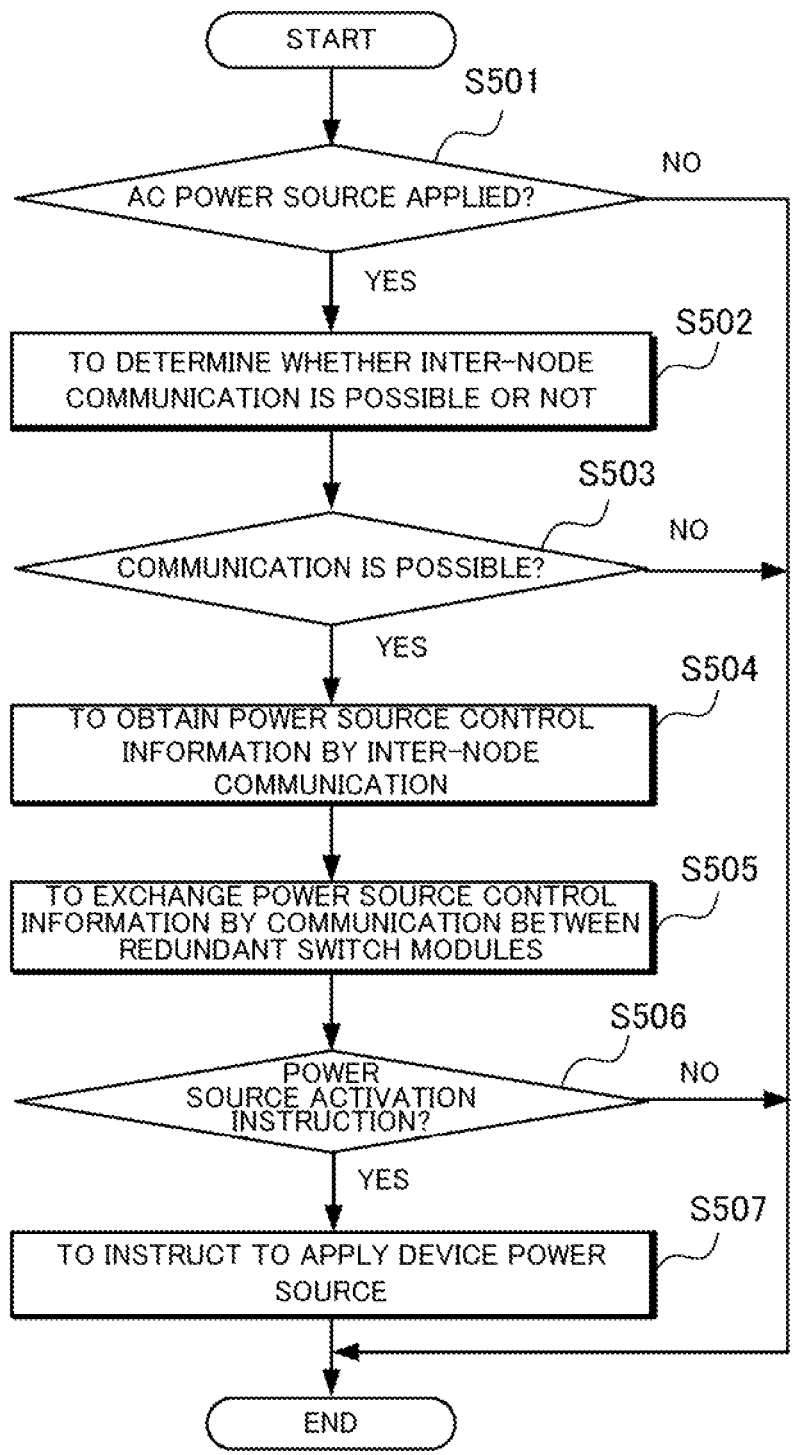
FIG. 5 is a flow chart showing operation of a disk array unit according to a third exemplary embodiment of the present invention.

As shown in the flow chart of FIG. 5, when activation of the AC power source is detected to start turning-on of electricity ("Yes" at Step S501), only the electricity of the switch modules 13 and 18 mounted on the disk array units 12 and 17 as extended nodes including an extended node is turned on, so that the switch processor 20 mounted on the switch module 18 operates. At this time, the switch processor 20 controls the other node connection control unit 21 to determine whether inter-node communication is possible with the switch module 13 of the disk array unit 12 as an extended node (Step S502).

Here, when the determination is made that communication with the disk array unit 12 as an expanded node is possible ("Yes" at Step S503), the switch module 18 (switch processor 20) of the disk array unit 17 as an extended node obtains power source control information from the switch module 13 of the disk array unit 12 as an extended node by inter-node communication through the cable 14 for connecting switch modules (Step S504).

After obtaining the power source control information by the above-described inter-node communication, the switch module 18 (switch processor 20) of the disk array unit 17 as an extended node executes communication between redundant switch modules through the cable 31 for connecting redundant switch modules to exchange information (Step S505). Information exchanged there is power source control information. Only when the power source control information between redundancy switch modules indicates power-on ("Yes" at Step S506), the switch processor 20 starts the processing of power-on to its own device power source (Step S507).

(Effects of the Third Exemplary Embodiment)

As described in the foregoing, the present exemplary embodiment enables power-on according to a state of power-on of a node in operation and solves the problem that the disk array unit formed of a plurality of nodes fails to start normally due to different power-on timing.

The reason is that the switch module 18 (switch processor 20) of the disk array unit 17 as an extended node discriminates a state of connection with other extended node by inter-node communication executed upon start of turning-on of electricity by activation of the AC power source, receives the power source control information from the extended node being connected and executes the processing of power-on to the main body of its own disk array unit.

(Fourth Exemplary Embodiment)

Next, a fourth exemplary embodiment of the present invention will be described.

Since a structure of a disk array unit according to the fourth exemplary embodiment which will be described in the following is the same as the structures of the disk array units according to the first, second and third exemplary embodiments, no description will be made thereof in order to avoid overlaps.

(Operation of the Fourth Exemplary Embodiment)

Figure 6:
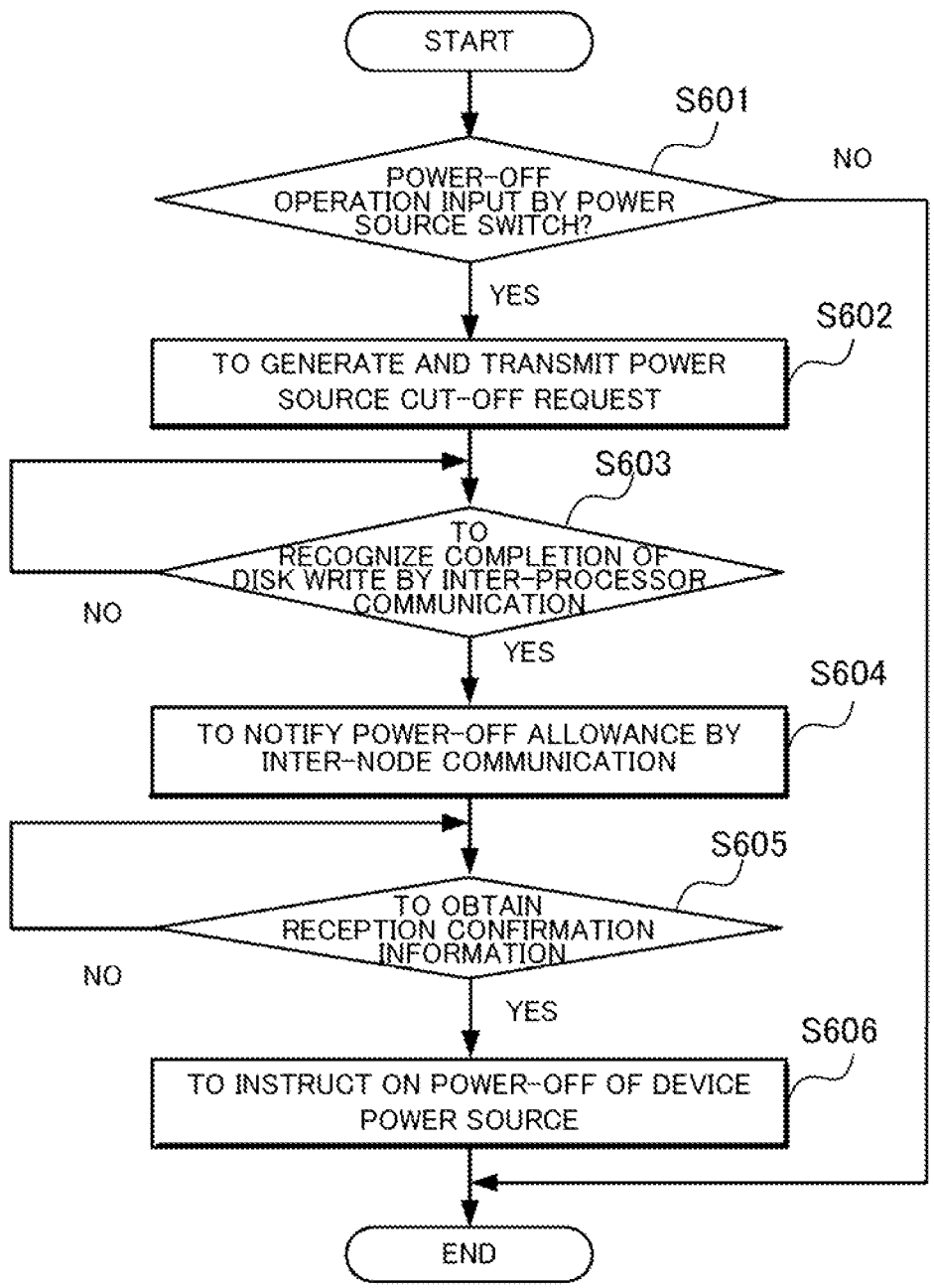
FIG. 6 is a flow chart showing operation of a disk array unit according to a fourth exemplary embodiment of the present invention.

In the following, description will be made of processing of cutting off a power source when power-off operation input is executed by the power source switch 25 mounted on the disk array unit 10 as a basic node with reference to the flow chart shown in FIG. 6. It is premised here that the power source control information indicates the state of power-on.

As shown in the flow chart in FIG. 6, the switch processor 20 mounted on the switch module 11 of the disk array unit 10 as a basic node starts execution of power-off processing which will be described in the following by the operation of the power source switch 25.

More specifically, the switch processor 20 which recognizes a power-off instruction upon receiving input of power-off operation by the power source switch 25 ("Yes" at Step S601) generates a power-off request and executes inter-processor communication with the microprocessor 43 of the array controller 40 through the internal communication bus 26 to issue a power-off request to the microprocessor 43 of the array controller 40 (Step S602).

The microprocessor 43 of the array controller 40 having received the power-off request stops the processing of the host interface 41 to start processing of writing data on the cache memory 42 into a magnetic disk stored in the disk array 50 by means of the magnetic disk control unit 45. At this time, the switch processor 20 mounted on the switch module 11 periodically confirms saving (write) of the data on the cache memory 42 into the magnetic disk by the inter-processor communication through the internal communication bus 26 until its completion. Then, when confirming the write completion ("Yes" at Step S403), the switch processor 20 transmits a notification that power-off is allowed to the switch module 13 as an extended node by using the inter-node communication through the cable 14 for connecting switch modules (Step S604).

The switch module 13 (switch processor 20) of the disk array unit 11 as an extended node executes processing of cutting off its own device power source at a time point of notifying information of reception confirmation about the power-off allowance notification after recognizing saving (write) of data on its own cache memory 42 into the magnetic disk stored in the disk array 50 by the inter-processor communication.

On the other hand, the switch module 11 (switch processor 20) of the disk array unit 10 as a basic node waits for arrival of the reception confirmation information as a response to the power-off allowance notification from the switch module 13 (switch processor 20) of the disk array unit 12 as an extended node ("Yes" at Step S605) and executes device power-off processing with respect to the main body of the disk array unit (Step S606).

(Effects of the Fourth Exemplary Embodiment)

As described in the foregoing, the present exemplary embodiment enables power-off while synchronizing a plurality of nodes at the time of starting up the power source.

The reason is that when the power-off operation input is executed by the power source switch 25, the switch module 11 of the disk array unit 10 as a basic node issues a power-off request to the array controller 40, transmits a power-off allowance notification to the switch module 13 of the disk array unit 12 as an extended node by the inter-node communication after recognizing completion of saving of data of the cache memory 42 that the array controller 40 has and obtains information about reception confirmation of the power-off allowance notification which confirmation is transmitted from the switch module 13 of the disk array unit 12 as an extended node that has received the power-off allowance notification to execute the processing of cutting off its own device power source. Thus, executing the power-off processing while synchronizing the nodes at the time of device power-off enables power-off to be executed more safely without data destruction.

This is also the case with synchronization processing for activating a disk array unit formed of a plurality of nodes in the lump by replacing the above-described power-off processing with a request for activating the device in the lump and in this case, not only power-on and power-off control but also re-activation processing of the device in the lump can be executed safely.

The functions that switch modules 11, 13 and 18 shown in FIG. 1 and FIG. 2 have may be realized all in software or at least a part of them in hardware. Data processing of controlling a power source of other node based on power source control information set at one of nodes which processing is executed by the switch processor 20 by the inter-node communication executed through a common signal line connecting the respective nodes may be realized on a computer by one or a plurality of programs, or at least a part of it may be realized in hardware.

Although the foregoing exemplary embodiments have been described mainly with respect to the structure where the power source switch 25 mounted on a basic node executes power-on and power-off processing, the structure may, not limited to the power source switch 25 mounted on the basic node, have the switch module 11 and the operation management server 16 (external device) connected to the network 19, thereby executing power source control such as power-on or power-off of the disk array units 10, 12 and 17 as the respective nodes by an instruction (power source control information) issued from the operation management server 16.

In this case, power source control by remote operation of the disk array unit by the operation management server 16 is enabled to improve convenience for use, thereby enabling a highly flexible system to be set up.

While the present invention has been described with respect to the plurality of preferred exemplary embodiments in the foregoing, the present invention is not necessarily limited to the above-described exemplary embodiments but can be implemented in various forms without departing from the spirit and scope of the technical idea.

What is claimed is:

1. In a plurality of disk array units connected to one another through a network, the plurality of disk array units being each assigned to one of a plurality of nodes, a disk array unit comprising:

a psical switch which decides whether a node concerned is a basic node or an extended node;

a control unit which, when the node concerned is said basic node, executes power source control of said extended node based on power source control information set at said basic node by inter-node communication executed through a common signal line which connects each said node; and a power source switch connected to the control unit and controls the control unit to execute power source control, wherein only an operation of the power source switch mounted on said basic node is determined as valid power source control information and an operation of the power source switch mounted on said extended node is determined as invalid power source control information, and wherein said control unit, when the node concerned is said basic node and power-off operation is input by the power source switch, issues a power-off request to a main body of said disk array unit, recognizes completion of saving of data of a cache memory in the main body of said disk array unit to transmit a power-off allowance notification to said extended node through inter-node communication, and executes power-off processing of a device power source of said basic node after obtaining a reception response of the power-off allowance notification transmitted from said extended node which has received the power-off allowance notification and has executed power-off processing of a device power source of said extended node.

2. The disk array unit according to claim 1, wherein each said node includes a main body of the disk array unit formed of a disk array in which a plurality of magnetic disks are stored and an array controller which controls read/write of a magnetic disk stored in said disk array, and a switch module including said control unit, and said control unit senses activation of an AC power source to start turning-on of electricity in the switch module except said disk array unit main body.

3. The disk array unit according to claim 1, wherein said control unit discriminates a state of connection with said extended node by said inter-node communication executed upon start of turning-on of electricity and transmits, to the extended node being connected, power source control information which instructs on execution of a process for applying a device power source to a main body of said disk array unit, and obtains, from said extended node which receives said power source control information and executes the process for applying the device power source to the main body of its own disk array unit, information of reception confirmation about said power source control information and executes the process for applying the device power source to the main body of its own disk array unit.

4. The disk array unit according to claim 1, wherein said control unit executes power source control of each said node based on power source control information transmitted from an external device connected to said plurality of nodes through the network.

5. The disk array unit according to claim 1, wherein said control unit executes power source control by switching on a first mode where, after start of turning-on of electricity, the control unit executes a process for applying a device power source to a main body of said disk array unit after waiting for input of power source activation operation by the power source switch mounted on said basic node and by switching on a second mode of executing the process for applying a device power source to said disk array unit in linkage with the start of said turning-on of electricity by setting an external device connected to said plurality of nodes through the network.

6. The disk array unit according to claim 1, wherein said control unit, when connecting an extended node to a disk array unit to which a device power source is already applied, discriminates a state of connection with another extended node by said inter-node communication and receives power source control information from the extended node being connected to execute a process for applying the device power source to the disk array unit of said extended node.

7. The disk array unit according to claim 1, wherein said control unit, when a switch module mounted on each said node adopts a redundant structure, discriminates matching of a connection state of said extended node by communication executed through a common signal line which connects said redundant switch modules and transmits said power source control information to an extended node whose connection is established based on the discrimination of matching.

8. A power source control method in a disk array unit, wherein a plurality of disk array units are connected to one another through a network, the plurality of disk array units being each assigned to one of a plurality of nodes, the power source control method comprising:
  a first step of deciding whether a node concerned is a basic node or an extended node;
  a second step of sensing establishment of communication between respective said nodes by inter-node communication executed through a common signal line which connects each said node; and
  a third step of executing, when the node concerned is said basic node, power source control of said extended node based on power source control information set at said basic node,
  wherein said third step includes the sub-steps of:
  when the node concerned is said basic node and power-off operation is input by a power source switch, issuing a power-off request to a main body of said disk array unit;
  recognizing completion of saving of data of a cache memory in the main body of said disk array unit to transmit a power-off allowance notification to said extended node through inter-node communication; and
  executing power-off processing of a device power source of said basic node after obtaining a reception response to the power-off allowance notification transmitted from said extended node which has received the power-off allowance notification and has executed power-off processing of a device power source of said extended node,
  wherein each disk array unit comprises the power source switch to control execution of power source control, and said third step further includes the sub-step of:
  determining only an operation of the power source switch mounted on said basic node as valid power source control information and determining an operation of the power source switch mounted on said extended node as invalid power source control information.

9. The power source control method in a disk array unit according to claim 8, wherein said third step includes the sub-step of:
  upon sensing activation of an AC power source, starting turning-on of electricity in a switch module which executes said power source control except a main body of the disk array unit formed of a disk array in which a plurality of magnetic disks are stored and an array controller for controlling read/write of a magnetic disk stored in said disk array.

10. The power source control method in a disk array unit according to claim 8, wherein said third step includes the sub-steps of:
  discriminating a state of connection with said extended node by said inter-node communication executed upon start of turning-on of electricity and transmitting, to the extended node being connected, power source control information which instructs on execution of a process for applying a power source to a main body of said disk array unit, and
  obtaining, from said extended node which receives said power source control information and executes the process for applying the device power source to the main body of its own disk array unit, information of reception confirmation about said power source control information and executing the process for applying the device power source to the main body of its own disk array unit.

11. The disk array unit according to claim 8, wherein said third step includes the sub-step of:
  executing power source control of each said node based on power source control information transmitted from an external device connected to said plurality of nodes through the network.

12. The power source control method in a disk array unit according to claim 8, wherein said third step includes the sub-step of:
  executing power source control by switching on a first mode where, after start of turning-on of electricity, the control unit executes a process for applying a device power source to a main body of said disk array unit after waiting for input of power source activation operation by the power source switch mounted on said basic node and by switching on a second mode of executing the process for applying a device power source to said disk array unit in linkage with the start of said turning-on of electricity by setting an external device connected to said plurality of nodes through the network.

13. The power source control method in a disk array unit according to claim 8, wherein said third step includes the sub-steps of:
  when connecting an extended node to a disk array unit to which a device power source is already applied, discriminating a state of connection with another extended node by said inter-node communication, and
  receiving power source control information from the extended node being connected to execute a process for applying the device power source to a main body of the disk array unit of said extended node.

14. The power source control method in a disk array unit according to claim 8, wherein said third step includes the sub-steps of:
  when a switch module mounted on each said node adopts a redundant structure, discriminating matching of a connection state of said extended node by communication executed through a common signal line which connects said redundant switch modules, and transmitting said power source control information to an extended node whose connection is established based on the discrimination of said matching.

15. A non-transitory computer-readable storage medium storing a power source control program to be executed on a disk array unit in a plurality of disk array units connected to one another through a network, the plurality of disk array units being each assigned to one of a plurality of nodes, wherein said power source control program causes a computer forming said disk array unit to execute:

a first process for deciding whether a node concerned is a basic node or an extended node;

a second process for sensing establishment of communication between respective said nodes by inter-node communication executed through a common signal line which connects each said node; and a third process for executing, when the node concerned is said basic node, power source control of said extended node based on power source control information set at said basic node, wherein in said third process, when the node concerned is said basic node and power-off operation is input by a power source switch, issuing a power-off request to a main body of said disk array unit, recognizing completion of saving of data of a cache memory in the main body of said disk array unit to transmit a power-off allowance notification to said extended node through inter-node communication, executing power-off process of a device power source of said basic node after obtaining a reception response to the power-off allowance notification which response is transmitted from said extended node which has received the power-off allowance notification and has executed power-off processing of a device power source of said extended node, wherein each disk array unit comprises the power source switch, and in said third process, only an operation of the power source switch mounted on said basic node is determined as valid power source control information and an operation of the power source switch mounted on said extended node is determined as invalid power source control information.

16. The non-transitory computer-readable storage medium according to claim 15, wherein in said third process upon sensing activation of an AC power source, turning-on of electricity is started in a switch module which executes said power source control except a main body of the disk array unit formed of a disk array in which a plurality of magnetic disks are stored and an array controller for controlling read/write of a magnetic disk stored in said disk array.

17. The non-transitory computer-readable storage medium according to claim 15, wherein in said third process a state of connection with said extended node is discriminated by said inter-node communication executed upon start of turning-on of electricity to transmit, to the extended node being connected, power source control information which instructs on execution of a process for applying a device power source to a main body of said disk array unit, and from said extended node which receives said power source control information and executes the process for applying the power source to the main body of its own disk array unit, information of reception confirmation about said power source control information is obtained to execute the process for applying the device power source to the main body of its own disk array unit.

18. The non-transitory computer-readable storage medium according to claim 15, wherein in said third process power source control of each said node is executed based on power source control information transmitted from an external device connected to said plurality of nodes through the network.

19. The non-transitory computer-readable storage medium according to claim 15, wherein in said third process power source control is executed by switching on a first mode where, after start of turning-on of electricity, the control unit executes a process for applying a device power source to a main body of said disk array unit after waiting for input of power source activation operation by the power source switch mounted on said basic node and by switching on a second mode of executing the process for applying a device power source to said disk array unit in linkage with the start of said turning-on of electricity by setting an external device connected to said plurality of nodes through the network.

20. The non-transitory computer-readable storage medium according to claim 15, wherein in said third process when connecting an extended node to a disk array unit to which a device power source is already applied, a state of connection with another extended node is discriminated by said inter-node communication to receive power source control information from the extended node being connected and execute a process for applying the device power source to a main body of the disk array unit of said extended node.

21. The non-transitory computer-readable storage medium according to claim 15, wherein in said third process when a switch module mounted on each said node adopts a redundant structure, matching of a connection state of said extended node is discriminated by communication executed through a common signal line which connects said redundant switch modules to transmit said power source control information to an extended node whose connection is established based on the discrimination of said matching.

* * * * *